P. MULLER.
MIDDLINGS-SEPARATOR.

No. 187,040. Patented Feb. 6, 1877.

WITNESSES:
Chas. Nida
John Gotthals

INVENTOR:
P. Muller
BY
Munn & Co.
ATTORNEYS.

N. PETERS, PHOTO-LITHOGRAPHER, WASHINGTON, D. C.

UNITED STATES PATENT OFFICE.

PETER MULLER, OF ST. CHARLES, MISSOURI.

IMPROVEMENT IN MIDDLINGS-SEPARATORS.

Specification forming part of Letters Patent No. 187,040, dated February 6, 1877; application filed September 22, 1876.

*To all whom it may concern:*

Figure 1:
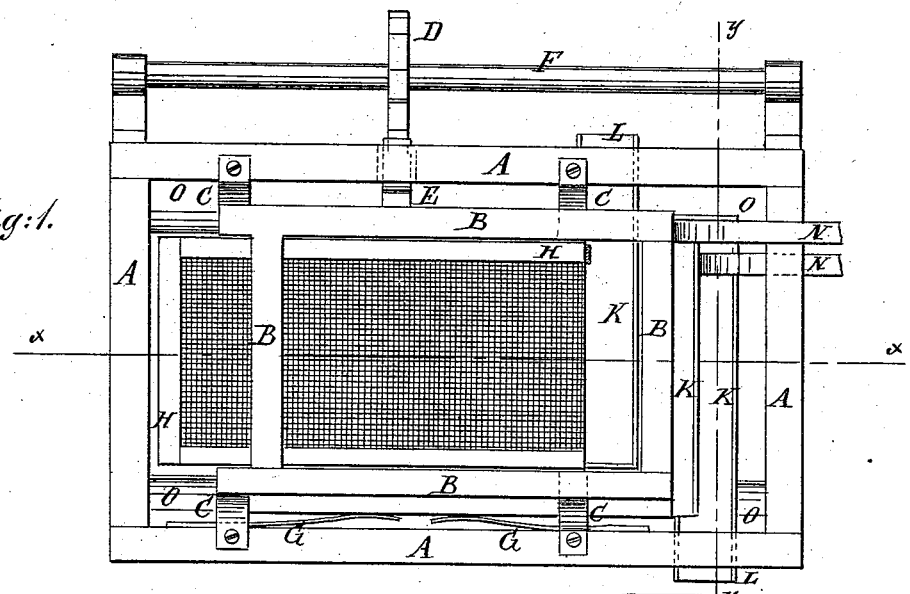
Figure 2:
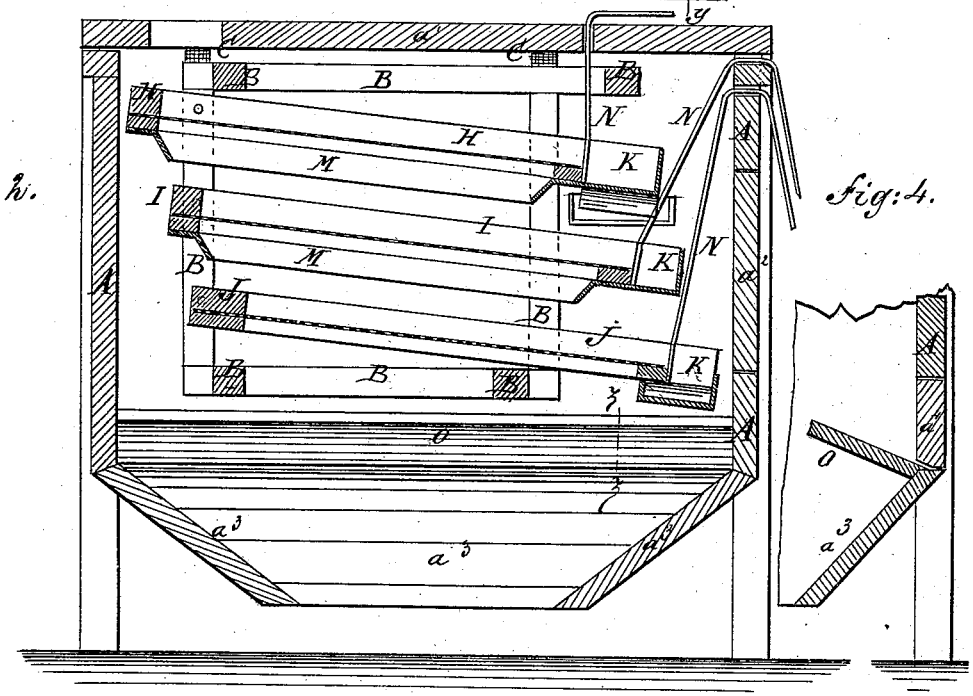
Figure 4:
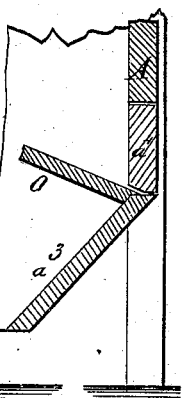
Figure 3:
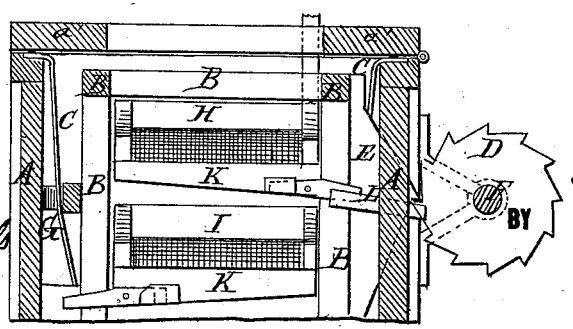

Be it known that I, PETER MULLER, of St. Charles, county of St. Charles, and State of Missouri, have invented a new and useful Improvement in Middlings-Purifier, of which the following is a specification:

Figure 1 is a top view of my improved machine, the cover being removed. Fig. 2 is a vertical longitudinal section of the same, taken through the line $x\ x$, Fig. 1. Fig. 3 is a vertical cross-section of the same, taken through the line $y\ y$, Fig. 1. Fig. 4 is a detail section, taken through the line $z\ z$, Fig. 2.

Similar letters of reference indicate corresponding parts.

The invention consists in suspending the frame of a middlings-purifier by straps, and providing it with a cam-wheel, pawl, shaft, and springs, arranged to reciprocate and jar the frame transversely to the flow of the material, as hereinafter described.

A is a box or case, which is provided with a hinged cover, $a^1$, and with removable panels $a^2$ in its side and end, to form practically a close case, an essential to the proper working of the machine, and to give access to the interior of the case, when desired, and to allow the progress of the work to be inspected. B is a frame, which is suspended from the upper edges of the sides of the box or case A by straps C of leather or other suitable material, and which is made enough narrower than the box A to allow it to be vibrated laterally within said box A. D is a large cam or ratchet-formed cam-wheel, against the teeth of which rests a projecting arm, $e$, formed with or otherwise rigidly attached to the side of the frame B, so that the said frame may be rapidly vibrated by the revolution of the ratchet-wheel D. The ratchet-wheel D is journaled upon a shaft, F, which revolves in bearings attached to the box A, or other suitable support, and is driven from any convenient power. G are springs, attached to the box A, and which press against the side of the frame B, to hold the cam E firmly against the ratchet-wheel D, so that the said frame B and its contents may receive a sharp jar every time the cam E passes from a tooth of the ratchet-wheel D. H I J are three adjustably-inclined sieves, placed one above the other, and provided with wire-cloth of different fineness of mesh, each upper one being coarser than the next lower one. The sieves are pivoted at their head ends to the frame B. The tail end of the lowest sieve rests upon a cross-bar of the frame B, and the lower end of each sieve rests upon strips of leather or other material, whereby each sieve may be raised or lowered according to the work being done. To the tail ends of the sieves H I J are attached spouts K, to receive the material that will not pass through the wire-cloth, and conduct it into the spouts L, through which it passes out of the box A. Each spout K may have its own discharge-spout L, or the upper spout K may have a separate discharge-spout, L, and the other two may discharge through a single spout, L. To the lower sides of the two upper sieves H I are attached short tapering or hopper-shaped guide-chutes M, converging from the ends and sides of each sieve-frame, to prevent the material that passes through each upper sieve from being thrown to the sides of the next lower sieve, and compel it to fall into said lower sieve. These converging chutes, during the rapid motion of the shoe or frame B, in addition to their function of conducting the material upon the next lower sieve, serve to guide and create air-currents between and through the sieves, thereby raising and keeping in suspension the light fuzzy particles of the middlings until they can settle over the sieves into the relatively dead-air space on either side of the sieves, and descend into the chutes O, whence they may be removed at pleasure through the gates $a^4$.

The material that passes through the lowest sieve falls into the hopper-shaped bottom $a^3$ of the box A, and passes out into a receiver, whence it is taken to the burrs to be reground for first-quality flour. The material that passes out through the spout K of the upper sieve is nothing but bran. The material that passes out through the spouts K of the lower sieves may be taken to the burrs to be reground for first or second quality of flour. The middlings are introduced into the head of the upper sieve H through a hole in the cover $a^1$. To the tail-ends of the sieves H I J are attached straps N, which pass out through holes in the casing A, so that the tail-ends of said sieves may be raised, when desired.

As the sieves are jarred laterally with respect to the flow of material on them by the ratchet-wheel and rigid arm D E, the light and fuzzy particles are raised like dust by the agitation and distribution of the air through case, and gradually escaping on each side of the sieves into the chute O at the lower part of said sides, from which they may be removed through the long narrow doors $a^4$ in the sides of the box A.

Having thus described my invention, I claim as new and desire to secure by Letters Patent—

In a middlings-purifier, a frame, B, suspended by straps C, and provided with cam-wheel D, pawl E, shaft F, and springs G, all arranged to give reciprocations and jar transversely to the flow of material, as set forth.

PETER MULLER.

Witnesses:
F. X. KREMER,
FRANCIS MARTEN.